(12) United States Patent
Kuritani et al.

(10) Patent No.: US 8,575,803 B2
(45) Date of Patent: Nov. 5, 2013

(54) MAGNETIC COUPLING DEVICE HAVING FIRST AND SECOND ROTATING MEMBERS ARRANGED WITH OPPOSING INTERACTION SURFACES

(75) Inventors: Kingo Kuritani, Miyagi (JP); Motohiko Ueda, Aichi (JP)

(73) Assignee: DENSO CORPORATION, Kariya (JP)

( * ) Notice: Subject to any disclaimer, the term of this patent is extended or adjusted under 35 U.S.C. 154(b) by 255 days.

(21) Appl. No.: 12/937,589

(22) PCT Filed: May 21, 2009

(86) PCT No.: PCT/JP2009/059328
§ 371 (c)(1),
(2), (4) Date: Oct. 13, 2010

(87) PCT Pub. No.: WO2009/142258
PCT Pub. Date: Nov. 26, 2009

(65) Prior Publication Data
US 2011/0031837 A1    Feb. 10, 2011

(30) Foreign Application Priority Data

May 21, 2008  (JP) ................................ 2008-132998

(51) Int. Cl.
| | |
|---|---|
| *H02K 7/10* | (2006.01) |
| *H02K 49/10* | (2006.01) |
| *H02K 7/11* | (2006.01) |
| *H02K 7/114* | (2006.01) |
| *H02K 49/00* | (2006.01) |

(52) U.S. Cl.
USPC ............................ 310/103; 310/105; 310/268

(58) Field of Classification Search
USPC ....................... 310/103, 92, 96, 105, 268, 104
IPC ................ H02K 7/11, 7/10, 7/114, 49/00, 49/10
See application file for complete search history.

(56) References Cited

U.S. PATENT DOCUMENTS

| | | | |
|---|---|---|---|
| 3,573,517 A | * | 4/1971 | Osterstrom .................... 310/103 |
| 6,346,784 B1 | * | 2/2002 | Lin .................................. 318/9 |

(Continued)

FOREIGN PATENT DOCUMENTS

| | | |
|---|---|---|
| JP | 05-168222 A | 7/1993 |
| JP | 07-308060 A | 11/1995 |

(Continued)

OTHER PUBLICATIONS

Machine translation of JP07-308060 (published Nov. 1995, translated Jul. 16, 2012).*

(Continued)

*Primary Examiner* — Burton Mullins
*Assistant Examiner* — Michael Andrews
(74) *Attorney, Agent, or Firm* — Posz Law Group, PLC

(57) ABSTRACT

A reduced-size magnetic coupling device includes a first magnet group having a plurality of first magnets arranged on an interaction surface at equal intervals in the direction of the circumference about the rotation axis; a second magnet group having a plurality of second magnets arranged on an interaction surface at equal intervals in the direction of the circumference about the rotation axis and in positions in the vicinity of the rotation axis; and a third magnet group having a plurality of third magnets that are arranged at equal intervals in the circumferential direction about the rotation axis and in positions outward with respect to the second magnets. The third magnets have an area approximately equal to that of the second magnets. Each third magnet has a magnetic pole different from that of the second magnet that is positioned between the third magnet and the rotation axis.

12 Claims, 12 Drawing Sheets

(56) References Cited

U.S. PATENT DOCUMENTS 7,013,859 B2 * 3/2006 Linnig .......................... 310/103
7,821,168 B2 * 10/2010 Halstead ....................... 310/103

FOREIGN PATENT DOCUMENTS

| JP | 07308060 A | * | 11/1995 |
| JP | 2001-165189 A | | 6/2001 |
| JP | 2007-198219 A | | 8/2007 |
| JP | 2008-051264 A | | 3/2008 |

OTHER PUBLICATIONS

International Search Report mailed on Aug. 18, 2009 for the corresponding International patent application No. PCT/JP2009/059328.

* cited by examiner

MAGNETIC COUPLING DEVICE HAVING FIRST AND SECOND ROTATING MEMBERS ARRANGED WITH OPPOSING INTERACTION SURFACES

CROSS REFERENCE TO RELATED APPLICATIONS

This application is a U.S. national stage application of PCT/JP2009/059328 filed on May 21, 2009, and claims priority to, and incorporates by reference, Japanese patent application No. 2008-132998 filed on May 21, 2008.

TECHNICAL FIELD

The present invention relates to a magnetic coupling device. More specifically, the present invention relates to a magnetic coupling device that includes a first rotating member and a second rotating member that are arranged such that their respective interaction surfaces are opposed to each other while being separated from each other. The first rotating member and the second rotating member are rotatable about the rotation axis that extends in a direction orthogonal to the interaction surfaces. The magnetic coupling device transmits torque from one of the rotating members to the other rotating member by using the magnetic force that is generated between the interaction surfaces of the first rotating member and the second rotating member.

BACKGROUND ART

As an example of a rotation transmission mechanism that transmits torque without contact, conventional magnetic coupling devices are known in which permanent magnets are arranged on the inner circumferential surface of a cylindrical drive rotating member and the outer circumferential surface of a cylindrical rotating driven member provided on the same rotation axis as of the drive rotating member so as to be opposed to each other through an air gap between the surfaces and in which torque from the drive rotating member is transmitted to the driven rotating member using the magnetic force that is generated between the inner circumferential surface and the outer circumferential surface (for example, Patent document 1).

Patent Document 1: Japanese Laid-open Patent Publication No. 2001-165189

DISCLOSURE OF INVENTION

Problem to be Solved by the Invention

However, it is difficult to reduce the overall size of the magnetic coupling device as disclosed in Patent Document 1 because the configuration of the device requires a certain size in the direction of the rotation axis.

Other magnetic coupling devices different from the above-described magnetic coupling devices are known in which a disk-shaped drive rotating member and a disk-shaped driven rotating member are arranged such that their respective interaction surfaces are opposed to each other while being separated from each other. In such a magnetic coupling device, the drive rotating member and the driven rotating member are rotatable about the rotation axis that extends along the single line in the direction orthogonal to the interaction surfaces of the drive rotating member and the driven rotating member, and torque is transmitted from the drive rotating member to the driven rotating member using the magnetic force (magnetic attraction) that is generated between the interaction surfaces of each drive rotating member and each driven rotating member. Such a magnetic coupling device can be, because of its configuration, a flat structure that is short in the direction of the rotation axis, which reduces the overall size of the device.

However, in such a magnetic coupling device that includes the disk-shaped drive rotating member and the disk-shaped driven rotating member, magnetic attraction occurs in the direction of the rotation axis between the drive rotating member and the driven rotating member and accordingly the load on the bearing member that supports the rotating members increases. Particularly, the greater the transmitted torque, the greater the magnetic attraction that is generated in the direction of the rotation axis becomes, which requires a mechanical strategy to deal with the increase.

To deal with the above-described circumstance, an objective of the present invention is to provide a reduced-size magnetic coupling device that can reduce magnetic attraction, which occurs in the direction of the rotation axis, and thus transmit torque preferably.

Means for Solving Problem

A magnetic coupling device according to an aspect of the present invention includes a first rotating member and a second rotating member that are arranged such that their respective interaction surfaces are opposed to each other while being separated from each other and that are rotatable about a common rotation axis that extends in a direction orthogonal to the interaction surfaces, to transmit torque from one of the first and second rotating members to the other using a magnetic force that is generated between the interaction surface of the first rotating member and the interaction surface of the second rotating member. The magnetic coupling device includes a first magnetic force unit that mainly causes magnetic repulsion in the direction of the rotation axis between an inner circumference area on the interaction surface of the first rotating member and an inner circumference area on the interaction surface of the second rotating member, the inner circumference areas being in the vicinity of the rotation axis; and a second magnetic force unit that mainly causes magnetic attraction in the direction of the rotation axis between an outer circumference area on the interaction surface of the first rotating member and an outer circumference area on the interaction surface of the second rotating member, the magnetic attraction being approximately equivalent to the magnetic repulsion, the outer circumference areas being radially outward with respect to the first magnetic force unit.

The magnetic coupling device may include a first magnet group that includes a plurality of first magnets that are arranged on the interaction surface of the first rotating member at predetermined intervals in the direction of the circumference whose center is the rotation axis such that adjacent magnetic poles are different from each other; a second magnet group that constitutes the first magnetic force unit in cooperation with a part of the first magnet group and that includes a plurality of second magnets that are arranged at predetermined intervals in the direction of the circumference whose center is the rotation axis and are arranged in positions within an opposing area on the interaction surface of the second rotating member such that adjacent magnetic poles are different from each other, the opposing area being capable of being opposed to the first magnets when the first rotating member rotates relative to the second rotating member, the positions being in the vicinity of the rotation axis; and a third magnet group that constitutes the second magnetic force unit in cooperation with a part of the first magnet group and that includes a plurality of third magnets that are arranged at predetermined intervals in the direction of the circumference whose center is the rotation axis and are arranged in positions within the opposing area on the interaction surface of the second rotating member such that adjacent magnetic poles are different from each other, the positions being outward with respect to the second magnets. Each third magnet may have an area approximately equal to that of each second magnet and have a magnetic pole different from that of the second magnet that is positioned between the third magnet and the rotation axis.

In the magnetic coupling device, each of the first magnets that constitute the first magnet group may include an inner-circumference magnet component that is provided in an area in the vicinity of the rotation axis and an outer-circumference magnet component that is provided radially outward with respect to the inner-circumference magnet component such that the outer-circumference magnet component is separated from the inner-circumference magnet component, the inner-circumference magnet component may be displaced radially outward in a single direction of rotation about the rotation axis, and the second magnets that constitute the second magnet group may be provided in the opposing area on the interaction surface of the second rotating member, and each of the second magnets may have an area approximately equal to that of the inner-circumference magnet component and is displaced radially outward in the single direction of rotation about the rotation axis, the opposing area being capable of being opposed to the inner-circumference magnet components when the first rotating member rotates relative to the second rotating member.

In the magnetic coupling device, a magnet unit for causing repulsion or attraction between the interaction surface of the first rotating member and the interaction surface of the second rotating member using the magnetic force may be arranged between the inner-circumference magnet components and the outer-circumference magnet components on the interaction surface of the first rotating member and between the second magnets and the third magnets on the interaction surface of the second rotating member.

In the magnetic coupling device, the first magnetic force unit may include inner-circumference magnets that have the same magnetic pole and that are arranged to be opposed to each other in positions on the respective interaction surfaces of the first rotating member and the second rotating member such that the inner-circumference magnets surrounds the rotation axis, the positions being in the vicinity of the rotation axis; a first middle-circumference magnet group that includes a plurality of first middle-circumference magnets that are arranged at predetermined intervals in the direction of the circumference whose center is the rotation axis and are arranged in positions on the interaction surface of the first rotating member such that adjacent magnetic poles are the same, the positions being outward with respect to the inner-circumference magnet; and a second middle-circumference magnet group that includes a plurality of second middle-circumference magnets that have the same magnetic pole as that of the first middle-circumference magnets and that are arranged at predetermined intervals in the direction of the circumference whose center is the rotation axis and are arranged in positions within an opposing area on the interaction surface of the second rotating member such that adjacent magnetic poles are the same, the opposing area being capable of being opposed to the first middle-circumference magnets when the first rotating member rotates relative to the second rotating member. The second magnetic force unit may include an outer-circumference magnetic member group that includes outer-circumference magnetic members that are arranged at predetermined intervals in the direction of the circumference whose center is the rotation axis and are arranged in positions on the interaction surface of the first rotating member, the positions being radially outward with respect to the first middle-circumference magnets; and an outer-circumference magnet group that includes a plurality of outer-circumference magnets that are arranged at predetermined intervals in the direction of the circumference whose center is the rotation axis and are arranged in positions on the interaction surface of the second rotating member such that adjacent magnetic poles are different from each other, the positions being capable of being opposed to the outer-circumference magnets when the first rotating member rotates relative to the second rotating member. The outer-circumference magnetic members that constitute the outer-circumference magnetic member group may be arranged in the positions radially outward with respect to the first middle-circumference magnets that constitute the first middle-circumference magnet group. However, it is satisfactory if the outer end portions of the outer-circumference magnetic members are radially outward with respect to the outer end portions of the first middle-circumference magnets. Thus, a case is covered in which the inner end portions of the outer-circumference magnetic members are radially inward with respect to the outer end portions of the first middle-circumference magnets. Similarly, the outer-circumference magnets that constitute the outer-circumference magnet group are arranged in the positions radially outward with respect to the second middle-circumference magnets that constitute the second middle-circumference magnet group. However, it is satisfactory if the outer end portions of the outer-circumference magnets are radially outward with respect to the outer end portions of the second middle-circumference magnets. Thus, a case is covered in which the inner end portions of the outer-circumference magnets may be radially inward with respect to the outer end portions of the second middle-circumference magnets.

In the magnetic coupling device, the outer-circumference magnets and the outer-circumference magnetic members that constitutes the second magnetic force unit may be arranged respectively on the interaction surface of the first rotating member and the interaction surface of the second rotating member such that the outer-circumference magnets and the outer-circumference magnetic members are aligned with the magnets that constitutes the first magnetic force unit in the direction of the rotation axis.

In the magnetic coupling device, the first magnet force unit and the second magnet force unit may be incorporated, in a common casing, together with the first rotating member and the second rotating member.

Effect of the Invention

According to the present invention, the first magnetic force unit mainly causes magnetic repulsion in the direction of the rotation axis between the inner circumference areas, in the vicinity of the rotation axis, on the interaction surfaces of the first rotating member and the second rotating member, and the second magnetic force unit mainly causes magnetic attraction approximately equivalent to the magnetic repulsion in the direction of the rotation axis between the outer circumference areas, radially outward with respect to the first magnetic force unit, on the interaction surfaces of the first rotating member and the second rotating member. Accordingly, the force that displaces the second rotating member in the direction of the rotation axis can be reduced, i.e., the thrust load can be reduced. In addition, there is no risk that the second rotating member is displaced in the direction of the rotation axis in a way that the second rotating member approaches to and separated from the first rotating member. Furthermore, because the second magnetic force unit is radially outward with respect to the first magnetic force unit, the magnetic attraction in the rotation direction that is generated by the second magnetic force unit is greater than the magnetic repulsion in the rotation direction that is generated by the first magnetic force unit. Accordingly, the second rotating member rotates in accordance with the first rotating member and torque can be transmitted from the first rotating member to the second rotating member. Furthermore, the device can be a flat structure that is short in the direction of the rotation axis, which reduces the overall size of the device. Accordingly, the effects are achieved in which, while the overall size of the device is reduced, the magnetic attraction that occurs in the direction of the rotation axis is reduced and thus torque can be transmitted preferably.

According to the magnetic coupling device according to claim 2 of the present invention, the first magnets are arranged on the interaction surface of the first rotating member at predetermined intervals in the direction of the circumference whose center is the rotation axis such that adjacent magnetic poles are different from each other, thereby configuring the first magnet group; the second magnets are arranged at predetermined intervals in the direction of the circumference whose center is the rotation axis and are arranged in positions, in the vicinity of the rotation axis, within an opposing area, which can be opposed to the first magnets when the first rotating member rotates relative to the second rotating member, on the interaction surface of the second rotating member such that adjacent magnetic poles are different from each other, thereby configuring the second magnet group; the third magnets are arranged at predetermined intervals in the direction of the circumference whose center is the rotation axis and are arranged in positions, which are outward with respect to the second magnets, within the opposing area on the interaction surface of the second rotating member such that adjacent magnetic poles are different from each other, thereby configuring the third magnet group; and the third magnets have an area approximately equal to that of the second magnets and each third magnet has a magnetic pole different from that of the second magnet that is positioned between the third magnet and the rotation axis. Thus, the magnetic repulsion that acts in the direction of the rotation axis between the first magnets and the second magnets is approximately equivalent to the magnetic attraction that acts in the direction of the rotation axis between the first magnets and the third magnets. Accordingly, the force that displaces the second rotating member in the direction of the rotation axis can be reduced, i.e., the thrust load can be reduced. In addition, there is no risk that the second rotating member is displaced in the direction of the rotation axis in a way that the second rotating member approaches to and separated from the first rotating member. Furthermore, the magnetic attraction in the rotation direction that acts between the third magnets and the first magnets is greater than the magnetic repulsion that acts between the second magnets and the first magnets. Accordingly, the second rotating member rotates in accordance with the first rotating member and torque can be transmitted from the first rotating member to the second rotating member. Furthermore, the device can be a flat structure that is short in the direction of the rotation axis, which reduces the overall size of the device. Accordingly, the effects are achieved in which, while the overall size of the device is reduced, the magnetic attraction that occurs in the direction of the rotation axis can be reduced and thus torque can be transmitted preferably.

BEST MODE(S) FOR CARRYING OUT THE INVENTION

Preferred embodiments of a coupling device according to the present invention will be described in detail with reference to the accompanying drawings.

First Embodiment

Figure 1:
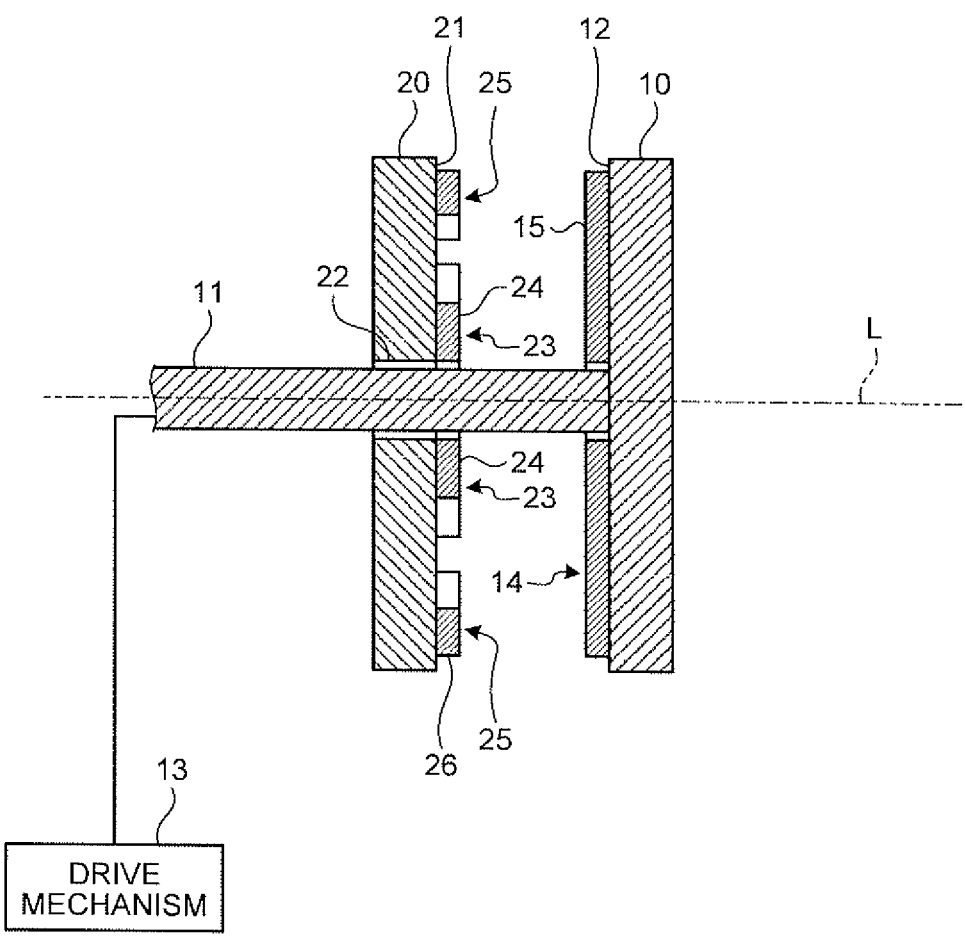
FIG. 1 is a cross-sectional side view schematically showing a magnetic coupling device according to a first embodiment of the present invention.

FIG. 1 is a cross-sectional side view schematically showing a magnetic coupling device according to a first embodiment of the present invention. The magnetic coupling device illustrated here includes a drive rotating member (first rotating member) 10 and a driven rotating member (second rotating member) 20.

Figure 2:
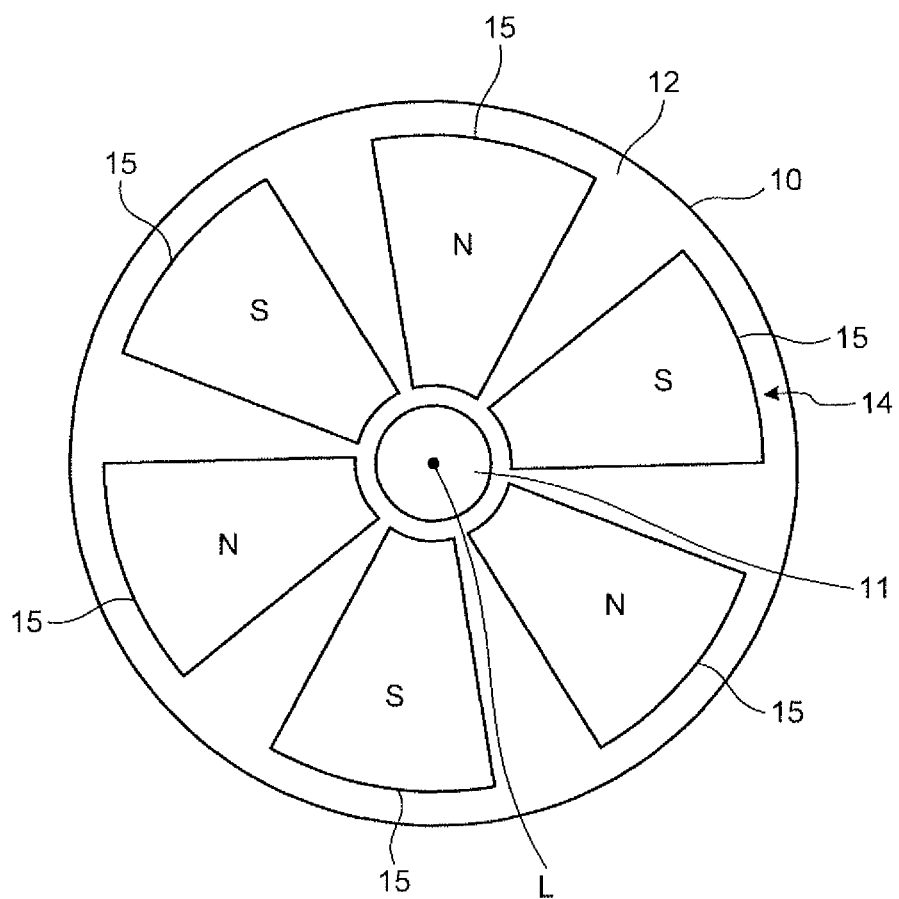
FIG. 2 is an explanatory view schematically showing an interaction surface of the drive rotating member shown in FIG. 1.

As shown in FIG. 2, the drive rotating member 10 is disk-shaped and is provided with a drive shaft 11 such that a rotation axis L passes through the center of the drive rotating member 10. More specifically, the drive rotating member 10 is provided with the drive shaft 11 such that the drive shaft 11 protrudes from an interaction surface 12 and the drive rotating member 10 is rotatable about the center of the drive shaft 11, i.e., about the rotation axis L. The drive shaft 11 is connected to a drive mechanism 13. The drive force from the drive mechanism 13 is applied to the drive rotating member 10 via the drive shaft 11 and accordingly the drive rotating member 10 rotates about the rotation axis L.

A first magnet group 14 is provided on the interaction surface 12 of the drive rotating member 10. The first magnet group 14 includes a plurality of (six in the example in the drawing) first magnets 15 that are permanent magnets. The first magnets 15 are arranged at equal intervals on the circumference whose center is the axis of the drive shaft 11, i.e., the rotation axis L. Each of the first magnets 15 has a shape such that its width gradually increases radially outward. The first magnets 15 are provided such that adjacent magnetic poles are different from each other.

Figure 3:
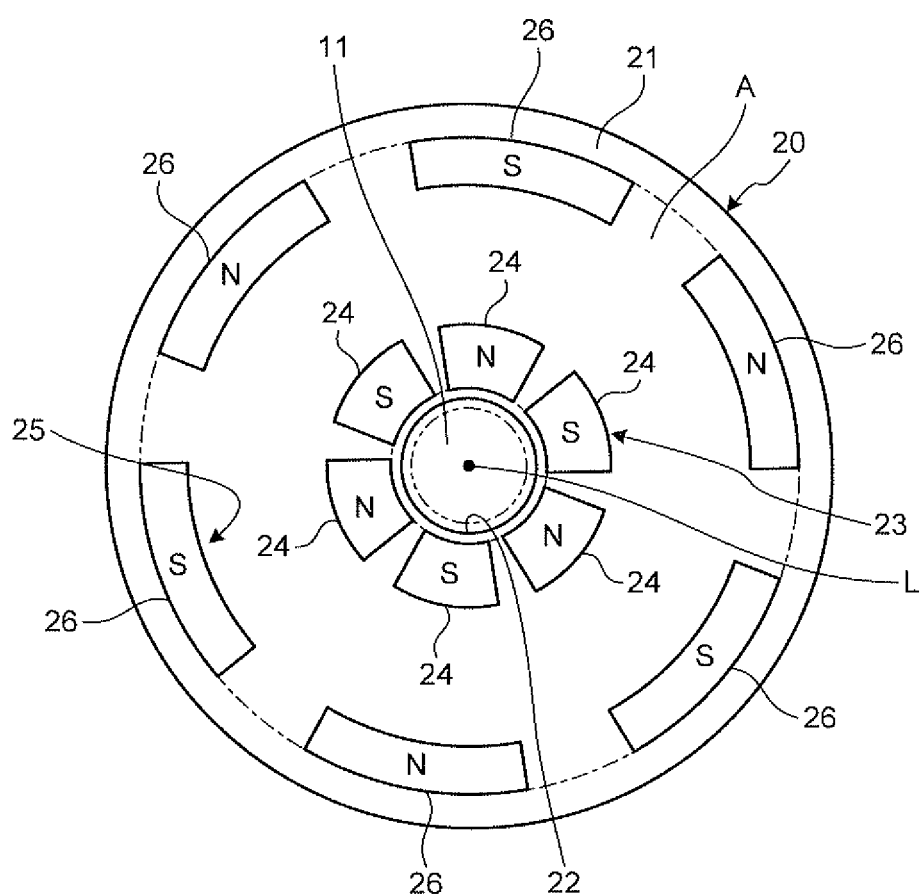
FIG. 3 is an explanatory view schematically showing an interaction surface of the driven rotating member shown in FIG. 1.

As illustrated in FIG. 3, the driven rotating member 20 is disk-shaped with an outer diameter that is approximately the same as that of the drive rotating member 10. The driven rotating member 20 is provided such that its interaction surface 21 is opposed to the interaction surface 12 of the drive rotating member 10 while being separated from the interaction surface 12. More specifically, the driven rotating member 20 is provided with a through hole 22 at the center area of the driven rotating member 20. The drive shaft 11 penetrates through the through hole 22. The driven rotating member 20 is provided such that it is rotatable about the center of the drive shaft 11, i.e., the rotation axis L, via a support member (not shown). Accordingly, the drive rotating member 10 and the driven rotating member 20 are arranged such that their interaction surfaces 12 and 21 are opposed to each other while being separated from each other and are rotatable about the rotation axis L that extends along the single line in the direction orthogonal to the interaction surfaces 12 and 21.

Although it is not illustrated in the drawings, the driven rotating member 20 is connected to a load via a connection member. The driven rotating member 20 rotates and thus transmits torque (drive force) to the load.

A second magnet group 23 and a third magnet group 25 are provided on the interaction surface 21 of the driven rotating member 20. The second magnet group 23 includes a plurality of (six in the example in the drawing) second magnets 24 that are permanent magnets. The second magnets 24 are arranged at equal intervals on the circumference whose center is the rotation axis L and are arranged in positions, in the vicinity of the drive shaft 11 (the rotation axis L), within an opposing area A on the interaction surface 21 of the driven rotating member 20, which is an opposing area that can be opposed to the first magnets 15 when the drive rotating member 10 rotates relative to the driven rotating member 20. In other words, the second magnets 24 are arranged in the direction of the circumference whose center is the rotation axis L. The second magnets 24 are provided such that adjacent magnetic poles are different from each other.

The third magnet group 25 includes a plurality of (six in the example in the drawing) third magnets 26 that are permanent magnets. The third magnets 26 are arranged at equal intervals on the circumference whose center is the rotation axis L and are arranged in outer positions with respect to the second magnets 24 within the opposing area A on the interaction surface 21 of the driven rotating member 20 and, more specifically, near the outer circumference of the interaction surface 21 of the driven rotating member 20. In other words, the third magnets 26 are arranged in the direction of the circumference whose center is the rotation axis L. The third magnets 26 are provided such that adjacent magnetic poles are different from each other.

The third magnets 26 are arranged radially outward with respect to the second magnets 24 and have an area approximately equal to that of the second magnets 24. Each third magnet 26 has a magnetic pole different from that of the second magnet 24 that is between the third magnet 26 and the rotation axis L. More specifically, when a second magnet 24 has a N pole, a third magnet 26 that is radially outward with respect to the second magnet 24 has a S pole. When a second magnet 24 has a S pole, a third magnet 26 that is radially outward with respect to the second magnets 24 has a N pole.

The magnetic coupling device that is configured as described above transmits torque from the drive rotating member 10 to the driven rotating member 20.

Figure 4:
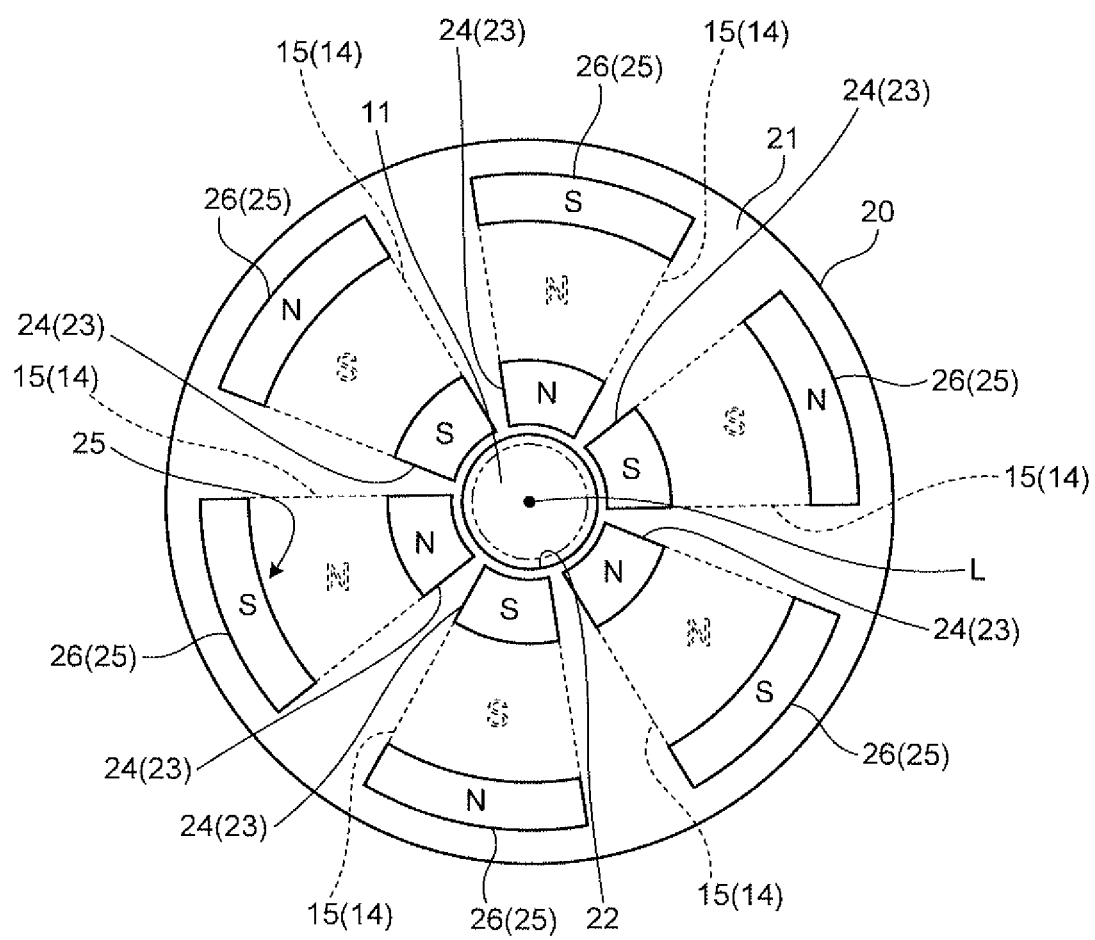
FIG. 4 is an explanatory view schematically showing a state in which a first magnet group on the drive rotating member shown in FIG. 1 is opposed to a second magnet group and a third magnet group on the driven rotating member shown in FIG. 3.

The drive rotating member 10 to which a drive force is applied from the drive mechanism 13 via the drive shaft 11 rotates about the center of the drive shaft 11, i.e., the rotation axis L. The drive rotating member 10 rotates so that, as illustrated in FIG. 4, the first magnets 15 on the drive rotating member 10 are opposed to the second magnets 24 and the third magnets 26 on the driven rotating member 20, i.e., the N-pole first magnets 15 are opposed to the N-pole second magnets 24 and the S-pole third magnets 26 and the S-pole first magnets 15 are opposed to the S-pole second magnets 24 and the N-pole third magnets 26. Once this occurs, while magnetic repulsion acts between the first magnets 15 and the second magnets 24, magnetic attraction acts between the first magnets 15 and the third magnets 26.

Because the second magnets 24 and the third magnets 26 have areas approximately equal to each other and the second magnets 24 and the third magnets 26 are arranged in the opposing area A, the magnetic repulsion that acts in the direction of the rotation direction axis L between the first magnets 15 and the second magnets 24 is approximately equal to the magnetic attraction that acts in the direction of the rotation axis L between the first magnets 15 and the third magnets 26.

Because the third magnets 26 are arranged outward with respect to the second magnets 24, i.e., the third magnets 26 are arranged near the outer circumference of the driven rotating member 20, the magnetic attraction in the rotation direction that acts between the third magnets 26 and the first magnets 15 is greater than the magnetic repulsion in the rotation direction that acts between the second magnets 24 and the first magnets 15, i.e., a rotation torque greater than that between the second magnet group 23 and the first magnet group 14 is generated between the third magnet group 25 and the first magnet group 14. Accordingly, the driven rotating member 20 rotates about the rotation axis L in accordance with the drive rotating member 10. In other words, the magnetic force that is generated between the interaction surfaces 12 and 21 of the drive rotating member 10 and the driven rotating member 20 transmits torque from the drive rotating member 10 to the driven rotating member 20. The transmitted torque is then transmitted to the load via the connection member.

In the above-described magnetic coupling device according to the first embodiment, the first magnets 15 are arranged on the interaction surface 12 of the drive rotating member 10 at equal intervals in the direction of the circumference whose center is the rotation axis L such that adjacent magnetic poles are different from each other, thereby constituting the first magnet group 14. The second magnets 24 are arranged at equal intervals in the direction of the circumference whose center is the rotation axis L and are arranged in positions, in the vicinity of the rotation axis L, within the opposing area A on the interaction surface 21 of the driven rotating member 20 such that adjacent magnetic poles are different from each other, thereby constituting the second magnet group 23. The third magnets 26 are arranged at equal intervals in the direction of the circumference whose center is the rotation axis L and are arranged at outward positions with respect to the second magnets 24 within the opposing area A on the interaction surface 21 of the driven rotating member 20 such that such that adjacent magnetic poles are different from each other, thereby constituting the third magnet group 25. The third magnets 26 have an area approximately equal to that of the second magnets 24 and each third magnet 26 has a pole different from that of the second magnet 24 that is positioned between the third magnet 26 and the rotation axis L. Thus, the magnetic repulsion that acts in the direction of the rotation axis L between the first magnets 15 and the second magnets 24 is approximately equal to the magnetic attraction that acts in the direction of the rotation axis L between the first magnets 15 and the third magnets 26. This reduces the force that displaces the driven rotating member 20 in the direction of the rotation axis L, i.e., reduces the thrust load. Furthermore, the magnetic attraction in the rotation direction that acts between the third magnets 26 and the first magnets 15 is greater than the magnetic repulsion in the rotation direction that acts between the second magnets 24 and the first magnets 15, i.e., a rotation torque greater than that between the second magnet group 23 and the first magnet group 14 is generated between the third magnet group 25 and the first magnet group 14. This rotates the driven rotating member 20 in accordance with the drive rotating member 10 so that the torque can be transmitted from the drive rotating member 10 to the driven rotating member 20. Furthermore, the drive rotating member 10 and the driven rotating member 20 are disk-shaped and accordingly the magnetic coupling device according to the first embodiment can be, because of its configuration, a flat structure that is short in the direction of the rotation axis L, which reduces the overall size of the device. Accordingly, while the overall size of the device is reduced, the magnetic attraction that is generated in the direction of the rotation axis L is reduced and thus torque can be transmitted preferably.

Particularly, because the magnetic repulsion that acts in the direction of the rotation axis L between the first magnets 15 and the second magnets 24 is approximately equal to the magnetic attraction that acts in the direction of the rotation axis L between the first magnets 15 and the third magnets 26, there is no risk that the driven rotating member 20 is displaced in the direction of the rotation axis L in a way that the driven rotating member 20 approaches and is separated from the drive rotating member 10. Accordingly, one of the rotating members can be prevented from being displaced in the direction of the rotation axis L in a way that the rotating member approaches and is separated from the other rotating member and thus torque can be transferred preferably.

Second Embodiment

Figure 5:
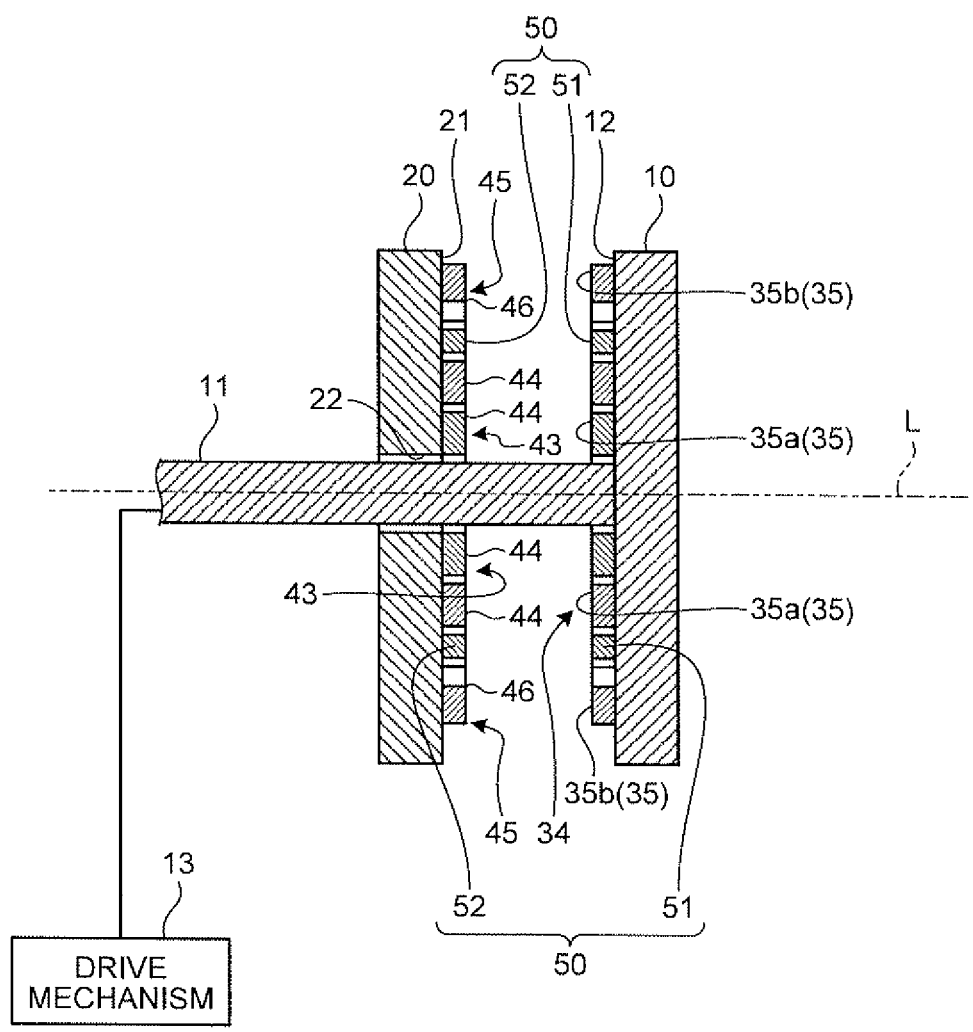
FIG. 5 is a cross-sectional side view schematically showing a magnetic coupling device according to a second embodiment of the present invention.

FIG. 5 is a cross-sectional side view schematically showing a magnetic coupling device according to a second embodiment of the present invention. The components whose configuration is the same as those of the above-described magnetic coupling device according to the first embodiment will be described using the same reference numerals.

The magnetic coupling device illustrated here includes the drive rotating member (first rotating member) 10 and the driven rotating member (second rotating member) 20.

Figure 6:
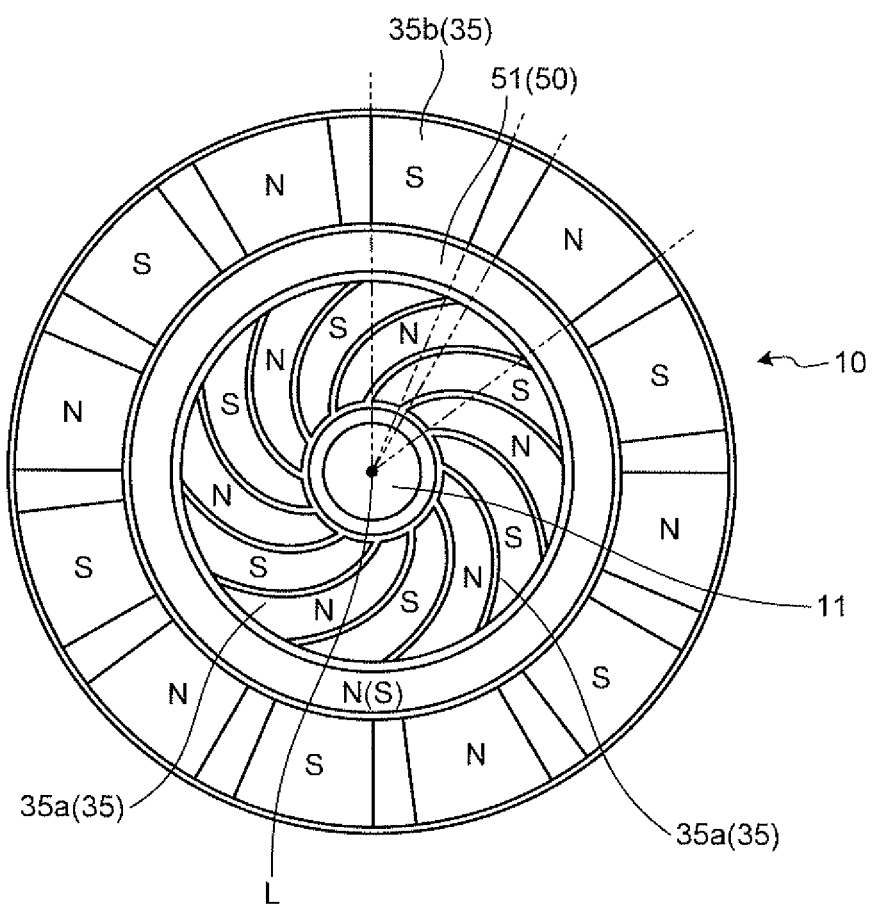
FIG. 6 is an explanatory view schematically showing an interaction surface of the drive rotating member shown in FIG. 5.

As illustrated in FIG. 6, the drive rotating member 10 is disk-shaped and is provided with the drive shaft 11 such that the rotation axis L passes through the center of the drive rotating member 10. More specifically, the drive rotating member 10 is provided with the drive shaft 11 such that the drive shaft 11 protrudes from the interaction surface 12 and the drive rotating member 10 rotates about the center of the axis of the drive shaft 11, i.e., about the rotation axis L. The drive shaft 11 is connected to the drive mechanism 13. The drive force from the drive mechanism 13 is applied to the drive rotating member 10 via the drive shaft 11. This rotates the drive rotating member 10 about the rotation axis L.

A first magnet group 34 is provided on the interaction surface 12 of the drive rotating member 10. The first magnet group 34 includes a plurality of (12 in the example in the drawing) first magnets 35 that are permanent magnets. The first magnets 35 are arranged at equal intervals on the circumference whose center is the center of the drive shaft 11, i.e., the rotation axis L, such that the adjacent magnetic poles are different from each other. The first magnets 35 each include a pair of an inner-circumference magnet component 35a and an outer-circumference magnet component 35b.

The inner-circumference magnet components 35a are arranged in an area in the vicinity of the drive shaft 11 (rotation axis L). The inner-circumference magnet components 35a are displaced in a single direction of rotation about the rotation axis L such that the width of the inner-circumference magnet components 35a gradually increases radially outward, i.e., clockwise in FIG. 6. The inner-circumference magnet components 35a extend, for example, along radial curves. Although the inner-circumference magnet components 35a extend along radial curves here, the present invention is not limited to this. For example, the inner-circumference magnet components 35a may extend along an involute line.

The outer-circumference magnet components 35b are arranged radially outward with respect to the inner-circumference circumference magnet components 35a such that the outer-circumference magnet components 35b are separated from the inner-circumference magnet components 35a. The outer-circumference magnet components 35b have an area approximately the same as that of the inner-circumference magnet components 35a. Each of the outer-circumference magnet components 35b has a shape such that its width gradually increases radially outward.

Figure 7:
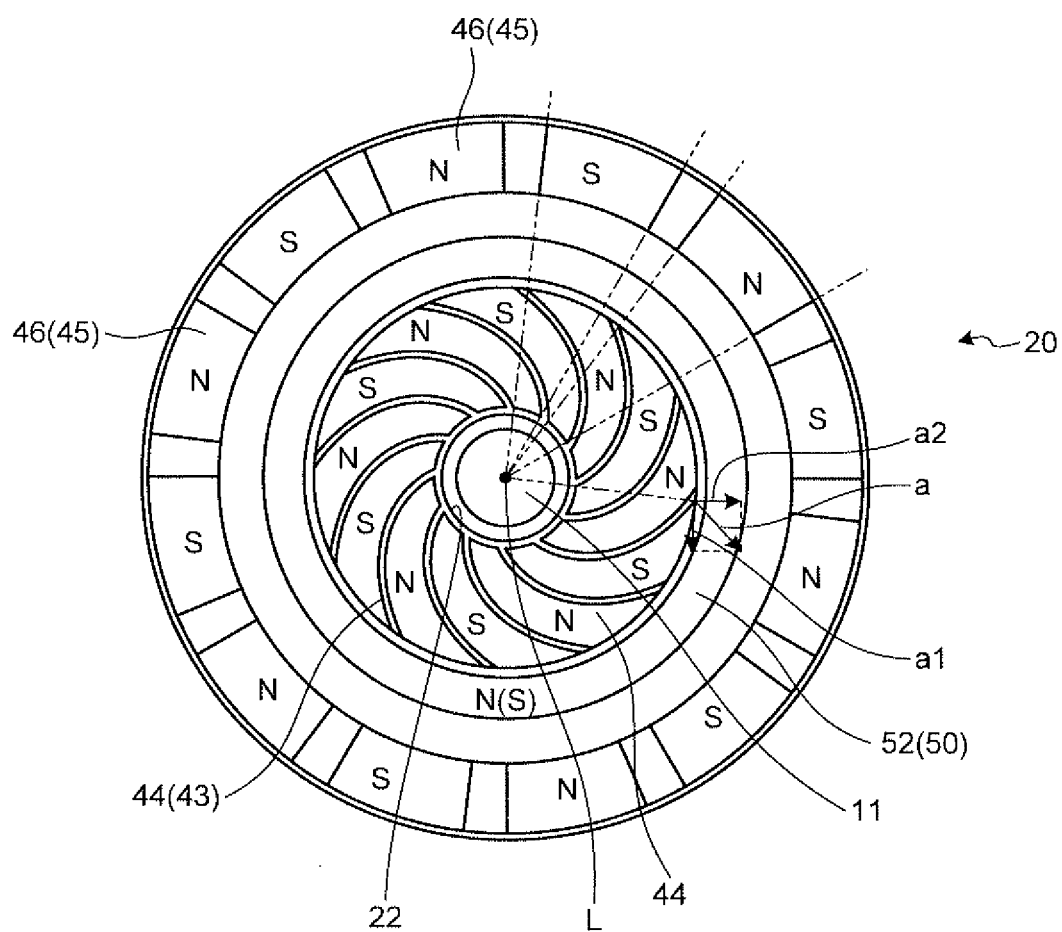
FIG. 7 is an explanatory view schematically showing an interaction surface of the driven rotating member shown in FIG. 5.

As illustrated in FIG. 7, the driven rotating member 20 is disk-shaped with an outer diameter that is approximately the same as that of the drive rotating member 10, and the driven rotating member 20 is provided such that its interaction surface 21 is opposed to the interaction surface 12 of the drive rotating member 10 while being separated from the interaction surface 12. More specifically, the driven rotating member 20 is provided with the through hole 22 at the center area of the driven rotating member 20, the drive shaft 11 penetrates through the through hole 22, and the driven rotating member 20 is provided such that it is rotatable about the center of the drive shaft 11, i.e., the rotation axis L, via a support member (not shown). Accordingly, the drive rotating member 10 and the driven rotating member 20 are arranged such that their interaction surfaces 12 and 21 are opposed to each other while being separated from each other and are rotatable about the rotation axis L that extends along the single line in the direction orthogonal to the interaction surfaces 12 and 21.

Although it is not illustrated in the drawings, the driven rotating member 20 is connected to a load via a connection member. The driven rotating member 20 rotates and thus transmits torque (drive force) to the load.

A second magnet group 43 and a third magnet group 45 are provided on the interaction surface 21 of the driven rotating member 20. The second magnet group 43 includes a plurality of (12 in the example in the drawing) second magnets 44 that are permanent magnets.

The second magnets 44 are arranged at equal intervals on the circumference whose center is the rotation axis L and are arranged in an area, which can be opposed to the inner-circumference magnet components 35a of the first magnets 35 when the drive rotating member 10 rotates relative to the driven rotating member 20, on the interaction surface 21 of the driven rotating member 20. In other words, the second magnets 44 are arranged in the direction of the circumference whose center is the rotation axis L. The second magnets 44 have an area approximately equal to that of the inner-circumference magnet components 35a and are provided such that adjacent magnetic poles are different from each other.

The second magnets 44 are displaced in a single direction of rotation about the rotation axis L such that the width of the second magnets 44 gradually increases radially outward, i.e., anticlockwise in FIG. 7. For example, the second magnets 44 extend along radial curves. Although the second magnets 44 extend along radial curves here, the present invention is not limited to this. For example, the second magnets 44 extend along an involute line.

The third magnet group 45 includes a plurality of (12 in the example in the drawing) third magnets 46 that are permanent magnets. The third magnets 46 are arranged at equal intervals on the circumference whose center is the rotation axis L and are arranged in an area, which can be opposed to the outer-circumference magnet components 35b of the first magnets 35 when the drive rotating member 10 rotates relative to the driven rotating member 20, on the interaction surface 21 of the driven rotating member 20 and, more specifically, in positions near the outer circumference of the interaction surface 21 of the driven rotating member 20. In other words, the third magnets 46 are arranged around the circumference whose center is the rotation axis L. The third magnets 46 are provided such that adjacent magnetic poles are different from each other.

The third magnets 46 are arranged radially outward with respect to the second magnets 44 and have an area approximately equal to that of the second magnets 44. Each third magnet 46 has a magnetic pole different from that of the second magnet 44 that is positioned between the third magnet and the rotation axis L. More specifically, when the magnetic pole of the outer-circumference magnet components 35b of a first magnet 35 is different from that of a third magnet 46 that is opposed to the outer-circumference magnet component 35b and thus magnetic attraction occurs, the inner-circumference magnet component 35a of a first magnet 35 and a second magnet 44, which is opposed to the inner-circumference magnet component 35a, have the same magnetic pole and thus magnetic repulsion occurs.

The magnetic coupling device according to the second embodiment is provided with a magnet unit 50. The magnet unit 50 includes a first ring magnet 51 and a second ring magnet 52. The first ring magnet 51 is ring-shaped. As illustrated in FIG. 6, the first ring magnet 51 is arranged on the interaction surface 12 of the drive rotating member 10 and is arranged between the inner-circumference magnet components 35a and the outer-circumference magnet components 35b such that the center of the first ring magnet 51 coincides with the rotation axis L.

The second ring magnet 52 is ring-shaped with an outer diameter and an inner diameter that are approximately equal to those of the first ring magnet 51. As illustrated in FIG. 7, the second ring magnet 52 is arranged on the interaction surface 21 of the driven rotating member 20 and is arranged between the second magnets 44 and the third magnets 46 and, more specifically, in a position that can be opposed to the first ring magnet 51 of the drive rotating member 10 such that the center of the second ring magnet 52 coincides with the rotation axis L.

In the magnet unit 50, the magnetic poles of the first ring magnet 51 and the second ring magnet 52 are not particularly specified. If the magnet unit 50 causes repulsion due to the magnetic force (magnetic repulsion) between the interaction surfaces 12 and 21, the first ring magnet 51 and the second ring magnet 52 have the same magnetic pole. In contrast, if the magnet unit 50 causes attraction due to the magnetic force (magnetic attraction) between the interaction surfaces 12 and 21, the first ring magnet 51 and the second ring magnet 52 have magnetic poles that are different from each other. More specifically, provided that the magnet unit 50 causes magnetic repulsion between the interaction surfaces 12 and 21, if the first ring magnet 51 has a N pole, the second ring magnet 52 has a N pole as well and, if the first ring magnet 51 has a S pole, the second ring magnet 52 has a S pole as well. Provided that the magnet unit 50 causes magnetic attraction between the interaction surfaces 12 and 21, if the first ring magnet 51 has a N pole, the second ring magnet 52 has a S pole and, if the first ring magnet 51 has a S pole, the second ring magnet 52 has a N pole.

Whether the magnet unit 50 causes magnetic repulsion or magnetic attraction between the interaction surfaces 12 and 21 depends on the overall magnetic force that acts between the first magnet group 34 and the second magnet group 43 and the third magnet group 45.

In the magnetic coupling device that is configured as described above, torque is transmitted from the drive rotating member 10 to the driven rotating member 20 as follows.

The drive rotating member 10 to which the drive force is applied from the drive mechanism 13 via the drive shaft 11 rotates about the center of the drive shaft 11, i.e., the rotation axis L. The drive rotating member 10 rotates and accordingly magnetic attraction acts between the first magnets 35 (the outer-circumference magnet components 35b) and the third magnets 46 and magnetic repulsion acts between the first magnets 35 (the inner-circumference magnet components 35a) and the second magnets 44.

The second magnets 44 and the third magnets 46 have areas approximately equal to each other and thus the magnetic repulsion that acts in the direction of the direction of the rotation axis L between the first magnets 35 and the second magnets 44 is approximately equal to the magnetic attraction that acts in the direction of the rotation axis L between the first magnets 35 and the third magnets 46.

Because the third magnets 46 are arranged outward with respect to the second magnets 44, i.e., near the outer circumference of the driven rotating member 20, the magnetic attraction in the rotation direction that acts between the third magnets 46 and the first magnets 35 (the outer-circumference magnet components 35b) is greater than the magnetic repulsion in the rotation direction that acts between the second magnets 44 and the first magnets 35 (the inner-circumference magnet components 35a), i.e., a rotation torque greater than that between the second magnet group 43 and the first magnet group 34 is generated between the third magnet group 45 and the first magnet group 34. Accordingly, the driven rotating member 20 rotates about the rotation axis L in accordance with the drive rotating member 10. In other words, the magnetic force that is generated between the interaction surfaces 12 and 21 of the drive rotating member 10 and the driven rotating member 20 transmits torque from the drive rotating member 10 to the driven rotating member 20. The transmitted torque is then transmitted to the load via the connection member.

Because the inner-circumference magnet components 35a of the first magnets 35 and the second magnets 44 extend along radial curves as described above, magnetic repulsion that acts between the inner-circumference magnet components 35a and the second magnets 44 occurs mainly outwardly as represented by the arrow a shown in FIG. 7. Accordingly, the magnetic repulsion is reduced that acts in the direction (represented by the arrow a1 shown in FIG. 7) opposite to the rotation direction of the drive rotating member 10 and the driven rotating member 20.

In the magnetic coupling device according to the second embodiment, in addition to the effects of the magnetic coupling device according to the first embodiment, the effects that will be described below can be achieved. Because the inner-circumference magnet components 35a of the first magnets 35 and the second magnets 44 extend along the radial curves, magnetic repulsion can be reduced that occurs in the direction opposite to the direction of rotation of the drive rotating member 10 and the driven rotating member 20. Accordingly, the magnetic attraction that acts between the outer-circumference magnet components 35b of the first magnets 35 and the third magnets 46 inhibits reduction in rotation torque of the driven rotating member 20 that rotates in accordance with the rotation of the drive rotating member 10.

In the magnetic coupling device, because the magnet unit 50 causes magnetic repulsion or magnetic attraction between the interaction surfaces 12 and 21, the absolute value of the thrust that acts in the direction of the rotation axis L can be adjusted. This adjusts the minimum gap or the maximum gap between the interaction surfaces 12 and 21.

The preferred first and second embodiments of the present invention have been described. However, the present invention is not limited to this and various modifications can be made. For example, in the first and second embodiments, the drive shaft 11 is provided to penetrate through the through hole 22 of the driven rotating member 20. In the present invention, the drive rotating member (first rotating member) and the driven rotating member (second rotating member) may be provided with shafts, respectively, such that the rotation axes are on a single line. Furthermore, in the first and second embodiments, the first rotating member is described as a drive rotating member and the second rotating member is described as a driven rotating member for expediency. In the present invention, the first rotating member may be a driven rotating member and the second rotating member may be a drive rotating member.

In the first embodiment, no particular component is provided between the second magnets 24 and the third magnets 26 on the interaction surface 21 of the driven rotating member 20. In the present invention, a plate member that is made of a diamagnetic material, such as copper, may be provided between the second magnet 24 and the third magnet 26 in the direction of the circumference about the rotation axis L.

In the first and second embodiments, the first magnet group 14, 34 is provided on the interaction surface 12 of the drive rotating member 10, and the second magnet group 23, 43 and the third magnet group 25, 45 are provided on the interaction surface 21 of the driven rotating member 20. In the present invention, the second magnet group 23, 43 and the third magnets 25, 45 may be provided on the interaction surface 12 of the drive rotating member 10 and the first magnet group 14, 34 may be provided on the interaction surface 21 of the driven rotating member 20.

Third Embodiment

Figure 8:
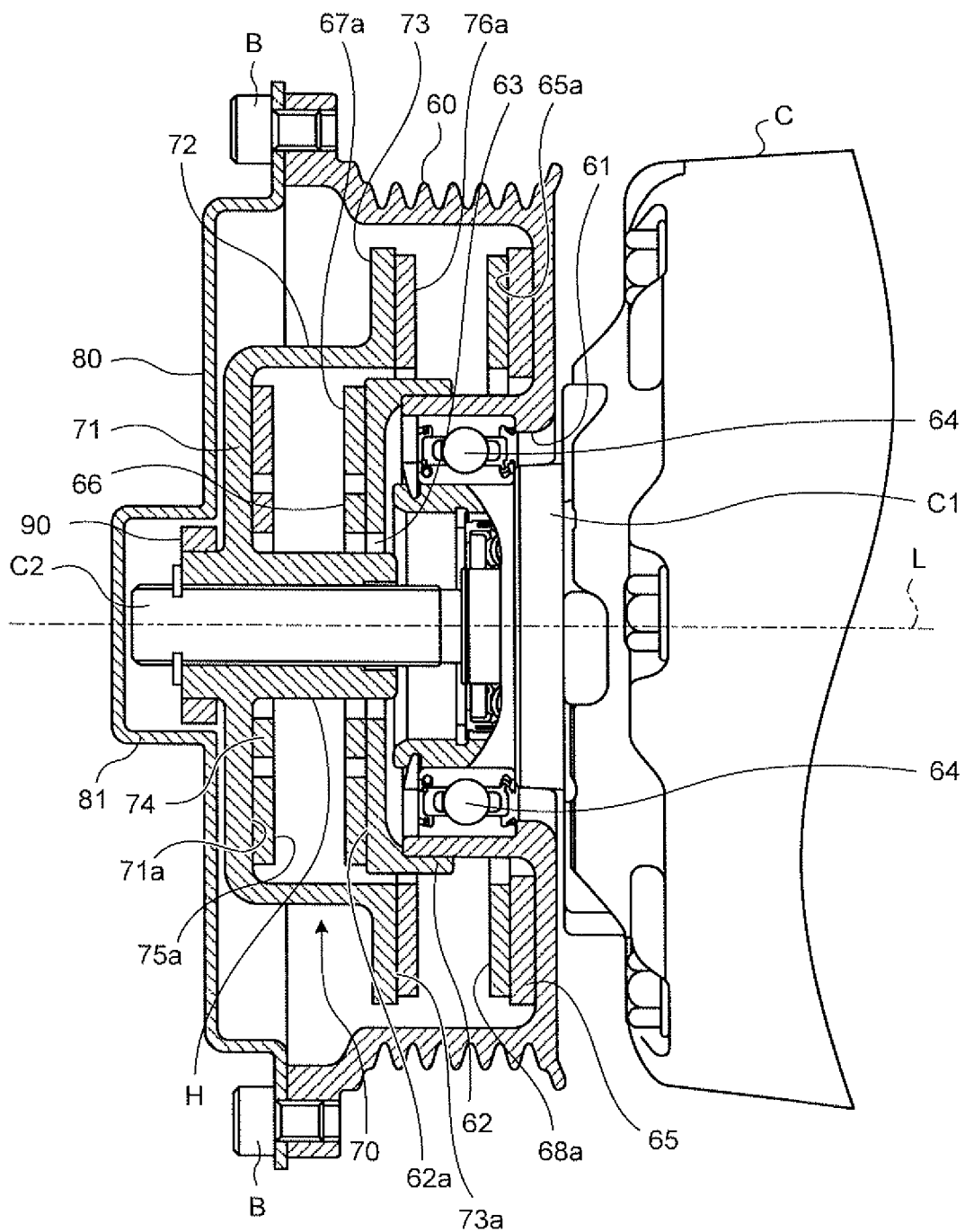
FIG. 8 is a cross-sectional side view schematically showing a partial cross section of a magnetic coupling device according to a third embodiment of the present invention.

FIG. 8 is a cross-sectional side view schematically showing a partial cross section of a magnetic coupling device according to a third embodiment of the present invention. Explanation will be given assuming that the left side in FIG. 8 is the front side and the right side in FIG. 8 is the back side. The magnetic coupling device illustrated here includes a pulley (first rotating member) 60 and a driven rotating member (second rotating member) 70.

The pulley 60 has an approximately cylindrical shape in which the front surface of the pulley 60 is open and the back surface of the pulley 60 is sealed. A cover 80 that is made of, for example, a magnetic material is attached to the pulley 60 with, for example, screws B so that the front surface of the pulley 60 is sealed with the cover 80. A concave portion 61 is formed at the center portion on the back surface of the pulley 60. A through hole 63 is formed at the center portion of a bottom wall portion 62 of the concave portion 61, i.e., at the center portion of the back surface of the pulley 60. A front portion C1 of a compressor body C enters the concave portion 61. The through hole 63 communicates with a compressor drive mechanism (not shown) that serves as a load and a drive shaft C2 that is provided to protrude forward from the front portion C1 of the compressor body C penetrates through the through hole 63. A tip portion of the drive shaft C2 that penetrates through the through hole 63 extends to the cover 80, which seals the front surface of the pulley 60, and the tip portion is supported, by the cover 80 via a support member (not shown), so as to be rotatable about the rotation axis L that is the center axis of the drive shaft C2. There is a bearing 64 between the concave portion 61 and the front portion C1 of the compressor body C.

A belt (not shown) that is suspended between the pulley 60 and an engine that is a drive mechanism is wound around the circumference of the pulley 60. The pulley 60 is a drive rotating member that rotates about the rotation axis L of the drive shaft C2 in synchronization with the engine speed. Because the bearing 64 is between the pulley 60 and the front portion C1 of the compressor body C as described above, rotation of the pulley 60 is never directly transmitted to the compressor body C. In addition, because the drive shaft C2 penetrates through the through hole 63 of the pulley 60 and is supported by the cover 80 so that it can rotate, even when the cover 80 rotates with the pulley 60, the rotation is never directly transmitted to the drive shaft C2.

A ring-shaped inner wall portion 65 that faces the front surface of the pulley 60 is arranged on the back surface of the pulley 60. The front surface of the inner wall portion 65 and the front surface of the bottom wall portion 62 constitute the interaction surface of the pulley 60. Hereinafter, for expediency, the front surface of the inner wall portion 65 is referred to as an outer-circumference interaction surface 65a and the front surface of the bottom wall portion 62 is referred to as an inner-circumference interaction surface 62a. As is clearly shown in FIG. 8, the outer-circumference interaction surface 65a and the inner-circumference interaction surface 62a extend in a direction orthogonal to the direction of the rotation axis L of the drive shaft C2, and the outer-circumference interaction surface 65a is aligned with the inner-circumference interaction surface 62a in the direction of the rotation axis L.

Figure 9:
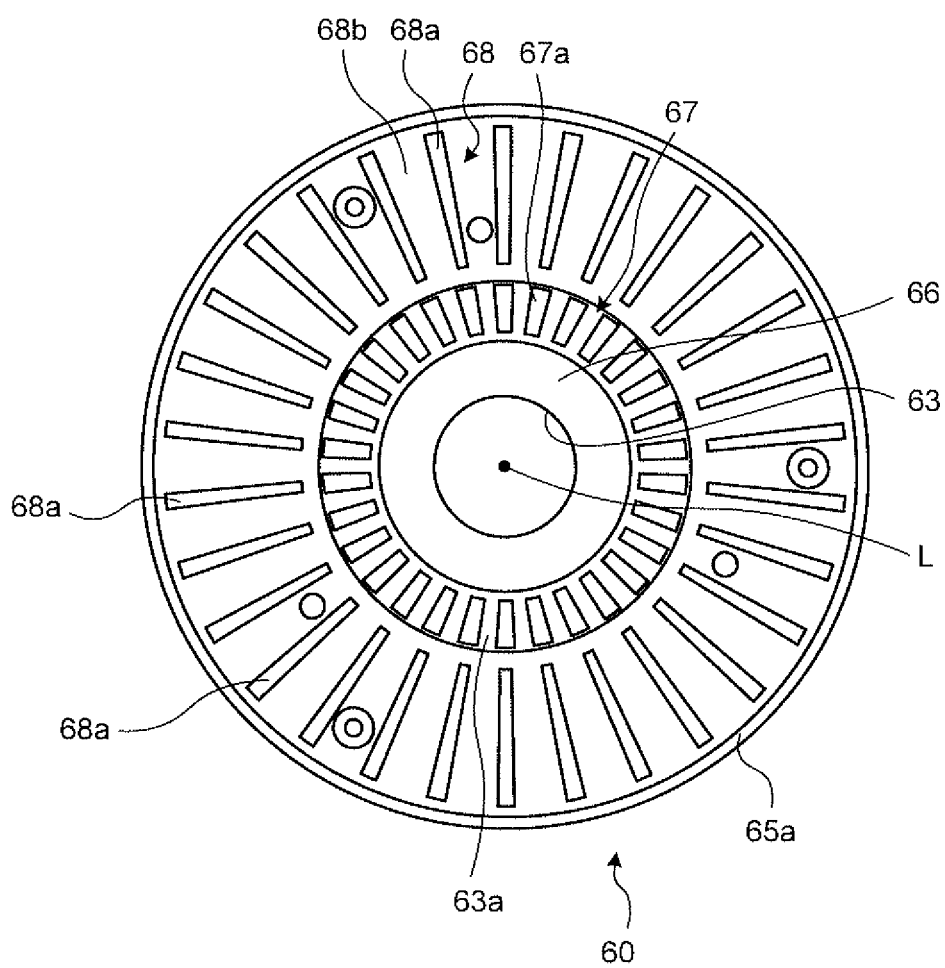
FIG. 9 is a front view of a configuration of each interaction surface of a pulley, showing the internal components of the pulley as seen from the front side.

FIG. 9 is a front view of a configuration of each of the interaction surfaces 62a and 65a of the pulley 60 showing the internal components of the pulley 60 as seen from the front side. As illustrated here, a drive inner-circumference magnet 66 and a first middle-circumference magnet group 67 are provided on the inner-circumference interaction surface 62a of the pulley 60.

The drive inner-circumference magnet 66 is ring-shaped and is provided at a position, in the vicinity of the rotation axis L, on the outer circumference of the through hole 63 such that the drive inner-circumference magnet 66 surrounds the rotation axis L.

The first middle-circumference magnet group 67 includes a plurality of (30 in the example in the drawing) first middle-circumference magnets 67a that are permanent magnets. The first middle-circumference magnets 67a are arranged at equal intervals on the circumference whose center is the axis of the drive shaft C2, i.e., about the rotation axis L. Each of the first middle-circumference magnets 67a has a shape such that its width gradually increases radially outward. The first middle-circumference magnets 67a are provided such that adjacent magnetic poles are the same.

An outer-circumference magnetic member group 68 is provided on an outer-circumference interaction surface 65a of the pulley 60. The outer-circumference magnetic member group 68 includes a plurality of (30 in the example in the drawing) yokes 68a that are magnetic members. The yokes 68a are arranged at equal intervals on the circumference whose center is the axis of the drive shaft C2, i.e., about the rotation axis L. Each of the yokes 68a has a shape such that its width gradually increases radially outward. The yokes 68a are surrounded by an overcurrent protection aluminum 68b, i.e., are buried in the overcurrent protection aluminum 68b.

The driven rotating member 70 is formed uniformly with a hub H that is provided on the outer circumference of the drive shaft C2. The driven rotating member 70 includes an inner-circumference radial outer portion 71, a horizontal extension portion 72 that extends backward with respect to the extension end portion of the inner-circumference radial outer portion 71, and an outer-circumference radial outer portion 73 that extends radially outward with respect to the extension end portion of the horizontal extension portion 72.

A drive unit (not shown) causes the hub H to slide in the axial direction of the drive shaft C2 independently of the drive shaft C2, i.e., the hub H can move such that it reaches and separates from the back surface of the pulley 60. When the hub H rotates about the rotation axis L, the hub H uniformly rotates with the drive shaft C2.

A position maintaining magnet 90 is arranged on a front end portion of the hub H, i.e., is arranged on an outer circumference portion on the front side with respect to the position at which the driven rotating member 70 is formed. As illustrated in FIG. 8, when the front end portion of the hub H is entering a cylindrical portion 81, which is formed in the cover 80, the position maintaining member 90 maintains the position of the hub H between the position maintaining member 90 and the inner circumference surface of the cylindrical portion 81 by using the magnetic force.

The back surfaces of the driven rotating member 70, i.e., the back surface of the inner-circumference radial outer portion 71 and the outer-circumference radial outer portion 73, are opposed respectively to the inner-circumference interaction surface 62a and outer-circumference interaction surface 65a while being separated from the inner-circumference interaction surface 62a and outer-circumference interaction surface 65a, thereby constituting the interaction surface of the driven rotating member 70. An interaction surface 73a of the outer-circumference radial outer portion 73 is aligned with an interaction surface 71a of the inner-circumference radial outer portion 71 in the direction of the rotation axis L.

Figure 10:
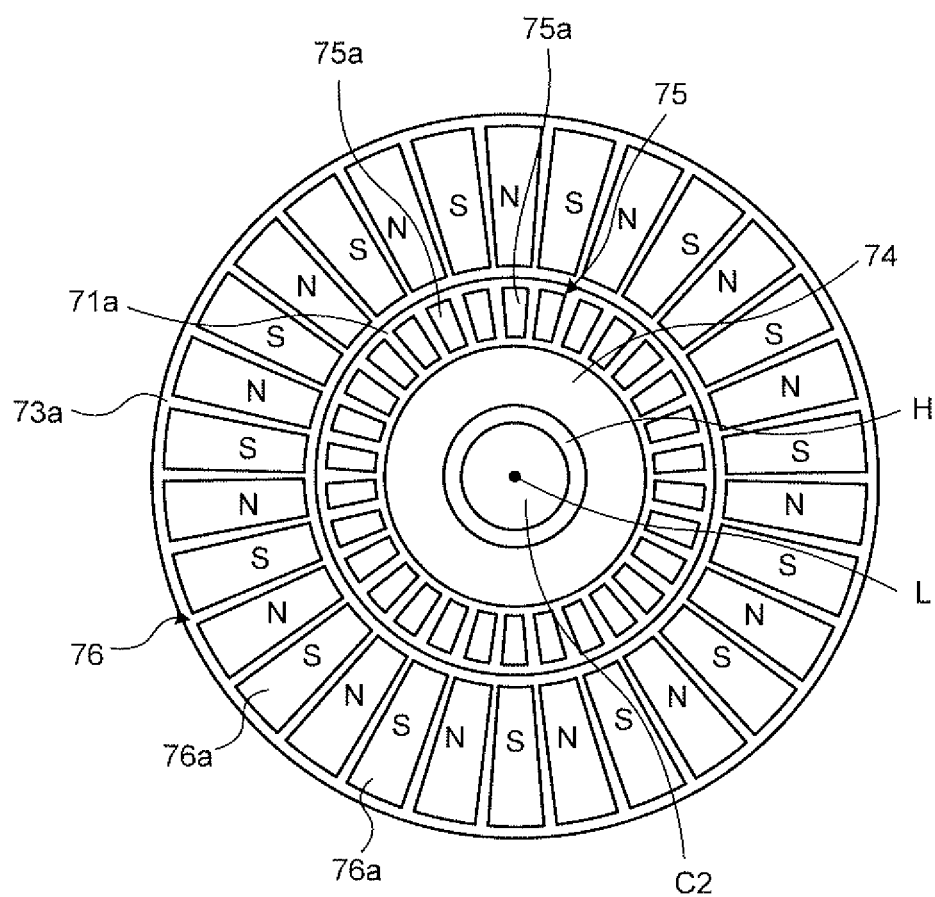
FIG. 10 is a back view of a configuration of each interaction surface of a driven rotating member, showing the driven rotating member as seen from the back side.

FIG. 10 shows configurations of the interaction surfaces 71a and 73a of the driven rotating member 70 and is a back view of the driven rotating member 70 seen from the back side. As illustrated here, a driven inner-circumference magnets 74 and a second middle-circumference magnet group 75 are provided on the interaction surface 71a of the inner-circumference radial outer portion 71 of the driven rotating member 70.

The driven inner-circumference magnet 74 is ring-shaped. The driven inner-circumference magnet 74 is provided in an inner circumferential area on the interaction surface 71a of the inner-circumference radial outer portion 71, i.e., in an area that can be opposed to the drive inner-circumference magnet 66, which is provided on the inner-circumference interaction surface 62a of the pulley 60, when the pulley 60 rotates relative to the driven rotating member 70. The driven inner-circumference magnet 74 has the same pole as that of the drive inner-circumference magnet 66.

The second middle-circumference magnet group 75 includes a plurality of (30 in the example in the drawing) second middle-circumference magnets 75a that are permanent magnets. The second middle-circumference magnets 75a are arranged at equal intervals on the circumference whose center is the rotation axis L of the drive shaft C2 and are arranged on an opposing area, which can be opposed to the first middle-circumference magnets 67a when the pulley 60 rotates relative to the driven rotating member 70, on the interaction surface 71a of the inner-circumference radial outer portion 71 of the driven rotating member 70. In other words, the second middle-circumference magnets 75a are arranged in the direction of the circumference whose center is the rotation axis L. The second middle-circumference magnets 75a are provided such that adjacent magnetic poles are the same. In addition, the second middle-circumference magnets 75a have the same magnetic pole as that of the first middle-circumference magnets 67a.

An outer-circumference magnet group 76 is provided on the interaction surface 73a of the outer-circumference radial outer portion 73 of the driven rotating member 70. The outer-circumference magnet group 76 includes a plurality of (30 in the example in the drawing) that is permanent magnets. The outer-circumference magnets 76a are arranged at equal intervals on the circumference whose center is the rotation axis L of the drive shaft C2 and are arranged on an opposing area, which can be opposed to the yokes 68a of the outer-circumference magnetic member group 68 when the pulley 60 rotates relative to the driven rotating member 70, on the interaction surface 73a of the outer-circumference radial outer portion 73 of the driven rotating member 70. In other words, the outer-circumference magnets 76a are arranged in the direction of the circumference whose center is the rotation axis L of the drive shaft C2. The outer-circumference magnets 76a are provided such that adjacent magnetic poles are different from each other.

The area of the outer-circumference magnets 76a and the area of the yokes 68a that correspond to the outer-circumference magnets 76a are previously adjusted such that magnetic attraction in the direction of the rotation axis L that acts between the outer-circumference magnets 76a and the yokes 68a is approximately equivalent to magnetic repulsion in the direction of the rotation axis L between the inner-circumference magnets 66 and 74 and between the middle-circumference magnet groups 67 and 75.

The magnetic coupling device that is configured as described above transmits torque from the pulley 60, which is a drive rotating member, to the driven rotating member 70 as follows.

Figure 11:
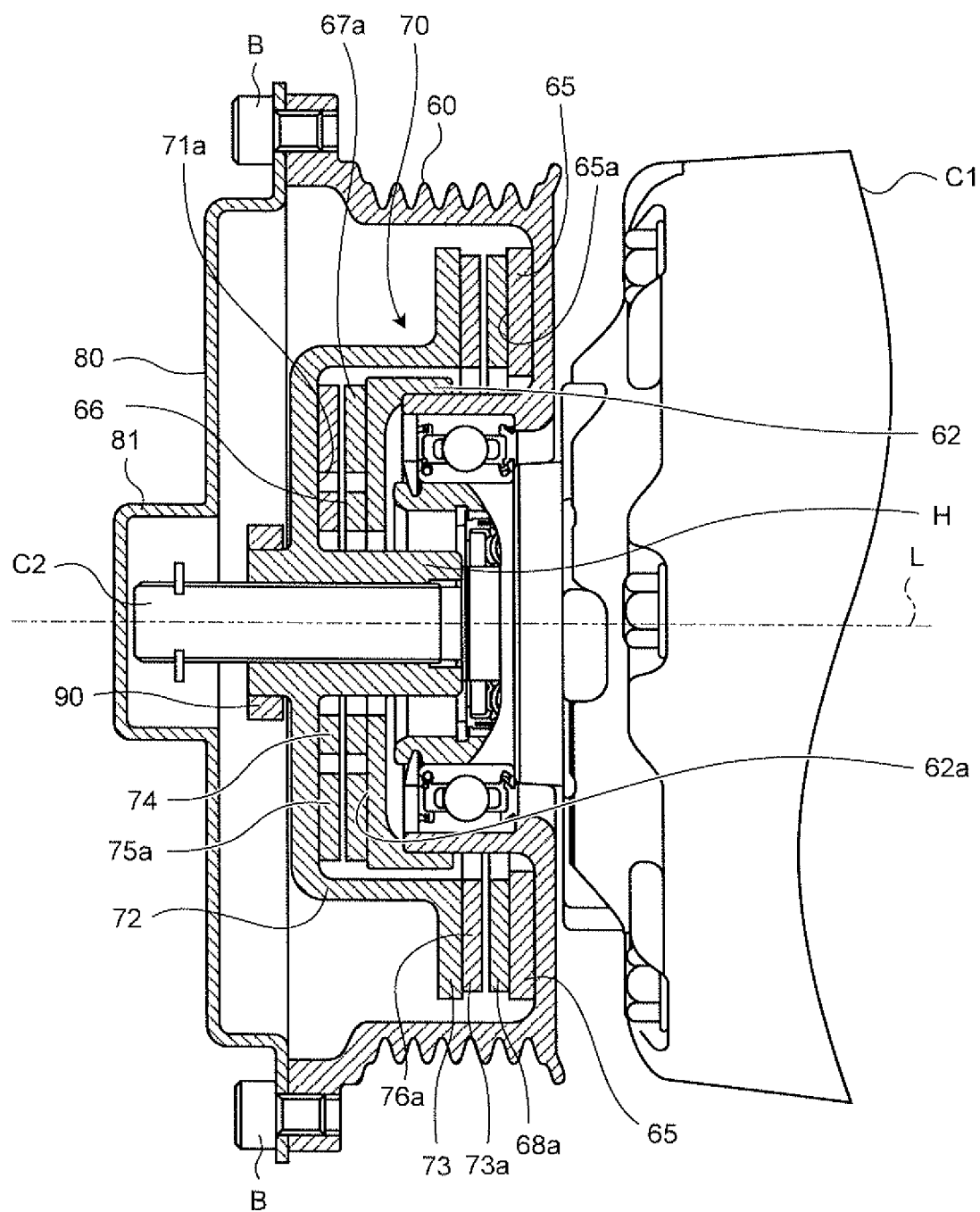
FIG. 11 is a cross-sectional view schematically showing a partial cross section of the magnetic coupling device according to the third embodiment.

As illustrated in FIG. 11, the drive unit causes the hub H to slide back to approach the back surface of the pulley 60. Accordingly, the interaction surfaces (the interaction surface 71a of the inner-circumference radial outer portion 71 and the interaction surface 73a of the outer-circumference radial outer portion 73) of the driven rotating member 70 approach respectively the interaction surfaces (the inner-circumference interaction surface 62a and the outer-circumference interaction surface 65a) of the pulley 60.

Figure 12:
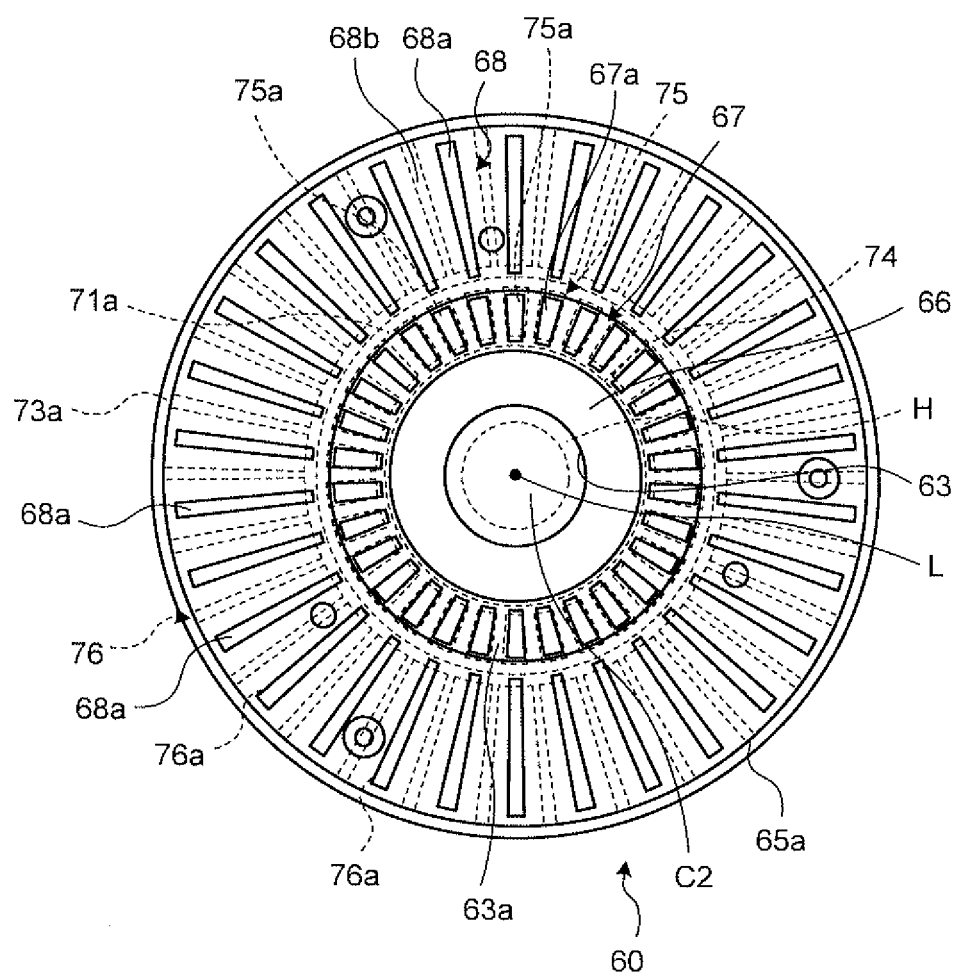
FIG. 12 is an explanatory view schematically showing a state in which a drive inner-circumference magnet, a first middle-circumference magnet group, and an outer-circumference magnetic member group on a pulley, which are all shown in FIG. 9, are opposed respectively to a driven inner circumferential magnet, a second middle-circumference magnet group, and an outer-circumference magnet group, which are all shown in FIG. 10.

As illustrated in FIG. 12, the yokes 68a and the outer-circumference magnets 76a are opposed to each other between the interaction surfaces 62a and 65a of the pulley 60 and the interaction surfaces 71a and 73a of the driven rotating member 70 so that magnetic attraction is caused between the yokes 68a and the outer-circumference magnets 76a. On the other hand, magnetic repulsion mainly acts between the first middle-circumference magnets 67a and the second middle-circumference magnets 75a and furthermore magnetic repulsion acts between the inner-circumference magnet 66 and the driven inner-circumference magnet 74. Thus, the magnetic repulsion that acts in the direction of the rotation axis L is approximately equal to the magnetic attraction that acts in the direction of the rotation axis L.

The yokes 68a are arranged radially outward with respect to the drive inner-circumference magnet 66 and the first middle-circumference magnets 67a and outer-circumference magnets 76a are arranged radially outward with respect to the driven inner-circumference magnet 74 and the second middle-circumference magnets 75a. Accordingly, the magnetic attraction in the direction of rotation about the rotation axis L that acts between the yokes 68a and the outer-circumference magnets 76a is greater than the magnetic repulsion in the direction of rotation about the rotation axis L that acts between the first middle-circumference magnets 67a and the second middle-circumference magnets 75a and greater than the magnetic repulsion in the direction of rotation about the rotation axis L that acts between the drive inner-circumference magnet 66 and the driven inner-circumference magnet 74. In other words, a rotation torque that is greater than that between the inner-circumference magnets 66 and 74 and that between the first middle-circumference magnet group 67 and the second middle-circumference magnet group 75 is generated between the outer-circumference magnetic member group 68 and the outer-circumference magnet group 76. Accordingly, the driven rotating member 70 rotates about the rotation axis L in accordance with the pulley 60. In other words, torque is transmitted from the pulley 60 to the driven rotating member 70 using the magnetic force that is generated between the interaction surfaces of the pulley 60 and the driven rotating member 70.

Once the driven rotating member 70 rotates about the rotation axis L, the rotation force is transmitted to the drive shaft C2 via the hub H, and the drive shaft C2 rotates about the rotation axis L so that the rotation force is transmitted to the compressor drive mechanism that is a load.

In the magnetic coupling device according to the third embodiment, the drive inner-circumference magnet 66, the driven inner-circumference magnet 74, the first middle-circumference magnet group 67, and the second middle-circumference magnet group 75 constitute the first magnetic force unit that mainly causes magnetic repulsion in the direction of the rotation axis L between the inner circumference areas, in the vicinity of the rotation axis L, on the respective interaction surfaces of the pulley (first rotating member) 60 and the driven rotating member 70. The outer-circumference magnetic member group 68 and the outer-circumference magnet group 76 constitutes the second magnetic force unit that causes magnetic attraction in the direction of the rotation axis L, approximately equivalent to the magnetic repulsion generated by the first magnetic force unit, between the outer circumference areas, which are radially outward with respect to the first magnetic force unit, on the interaction surfaces of the pulley 60 and the driven rotating member 70. Accordingly, the force that displaces the driven rotating member 70 in the direction of the rotation axis L can be reduced, i.e., the thrust load can be reduced.

Because the second magnetic force unit is arranged radially outward with respect to the first magnetic force unit, the second magnetic force unit can generate a rotation torque greater than that generated by the first magnetic force unit. Thus, the driven rotating member 70 rotates in accordance with the pulley 60 and accordingly torque can be transmitted from the pulley 60 to the driven rotating member 70. Furthermore, because of the configuration of the pulley 60 and the driven rotating member 70, the magnetic coupling device according to the third embodiment can be a flat structure that is short in the direction of the rotation axis L, which reduces the overall size of the device. Accordingly, while reducing the overall size of the device, magnetic attraction in the direction of the rotation axis L can be reduced and thus torque can be preferably transmitted.

The magnetic coupling device according to the third embodiment of the present invention employs the configuration in which the outer-circumference magnetic member group 68 and the outer-circumference magnet group 76 that cause magnetic attraction are arranged respectively on the outer-circumference interaction surface 65a and the interaction surface 73a of the outer-circumference radial outer portion 73, in which the inner-circumference magnets, the first middle-circumference magnet group 67, and the second middle-circumference magnet group 75 that cause magnetic repulsion are arranged on the inner-circumference interaction surface 62a and the interaction surface 71a of the inner-circumference radial outer portion 71, and in which the outer-circumference magnetic member group 68 and the outer-circumference magnet group 76 are aligned in the direction of the rotation axis L. In this configuration, the size of the inner-circumference magnets, the first middle-circumference magnets 67a, and the second middle-circumference magnets 75a can be increased as required and accordingly the magnetic force that occurs in the direction of the rotation axis L can be accurately adjusted flexibly.

Furthermore, in the magnetic coupling device according to the third embodiment, a generator that generates a magnetic force between the interaction surfaces of the pulley 60 and the respective interaction surfaces of the driven rotating member 70 is incorporated in the casing that is formed of the pulley 60 and the cover 80. Accordingly, unnecessary magnetic dust is prevented from entering from the outside and being adhered to the magnets that are arranged on the interaction surfaces.

Furthermore, in the above-described magnetic coupling device, in the state in which the driven rotating member 70 is separated from the interaction surface of the pulley 60 (in the off state) as illustrated in FIG. 8, the position maintaining magnet 90 that is arranged on the front end portion of the hub H maintains the position of the hub H using the magnetic force between the position maintaining magnet 90 and the inner circumference of the cylindrical portion 81, thereby preferably maintaining the off state.

In the third embodiment, the yokes 68a that constitute the outer-circumference magnetic member group 68 are arranged in positions radially outward with respect to the first middle-circumference magnets 67a that constitute the first middle-circumference magnet group 67. However, in the present invention, it is satisfactory if the outer end portions of the yokes 68a are radially outward with respect to the outer end portions of the first middle-circumference magnets and thus the inner end portions of the outer-circumference magnetic members may be radially inward with respect to the outer end portions of the first middle-circumference magnets 67a. Similarly, the outer-circumference magnets 76a that constitute the outer-circumference magnet group 76 are arranged in positions radially outward with respect to the second middle-circumference magnets 75a that constitute the second middle-circumference magnet group 75. However, in the present invention, it is satisfactory if the outer end portions of the outer-circumference magnets 76a are radially outward with respect to the outer end portions of the second middle-circumference magnets 75a and thus the inner end portions of the outer-circumference magnets 76a may be radially inward with respect to the outer end portions of the second middle-circumference magnets 75a.

INDUSTRIAL APPLICABILITY

As described above, the magnetic coupling device according to the present invention is suitable for transmitting torque from one of a first and second rotating members to the other using a magnetic force that is generated between the first rotating member and the second rotating member that are arranged such that their interaction surfaces are opposed to each other while being separated from each other.

The invention claimed is:

1. A magnetic coupling device comprising:
a first rotating member and a second rotating member, each of which includes a plurality of magnets arranged such that magnetic poles of the magnets adjacent in a direction of circumference are different from each other, that are arranged such that their respective interaction surfaces are opposed to each other while being separated from each other and that are rotatable about a common rotation axis that extends in a direction orthogonal to the interaction surfaces, to transmit torque from one of the first and second rotating members to the other using a magnetic force that is generated between the interaction surface of the first rotating member and the interaction surface of the second rotating member, either one of the first and second rotating member being rotatably connected to the rotation axis via a bearing;
a first magnetic force unit that, when transmitting the torque, causes magnetic repulsion in the direction of the rotation axis between an inner circumference area on the interaction surface of the first rotating member and an inner circumference area on the interaction surface of the second rotating member, the inner circumference areas being in the vicinity of the rotation axis; and
a second magnetic force unit that, when transmitting the torque, causes magnetic attraction in the direction of the rotation axis between an outer circumference area on the interaction surface of the first rotating member and an outer circumference area on the interaction surface of the second rotating member, the outer circumference areas being radially outward with respect to the first magnetic force unit,
wherein the second magnet force unit is configured to cause the magnetic attraction in the rotation direction of the rotation axis between the outer circumference areas that is greater than a magnetic repulsion in a rotation direction of the rotation axis that the first magnetic force unit causes between the inner circumference areas.

2. The magnetic coupling device according to claim 1, comprising:
a first magnet group that includes a plurality of first magnets that are arranged on the interaction surface of the first rotating member at predetermined intervals in the direction of the circumference whose center is the rotation axis such that adjacent magnetic poles are different from each other;
a second magnet group that constitutes the first magnetic force unit in cooperation with a part of the first magnet group and that includes a plurality of second magnets that are arranged at predetermined intervals in the direction of the circumference whose center is the rotation axis and are arranged in positions within an opposing area on the interaction surface of the second rotating member such that adjacent magnetic poles are different from each other, the opposing area being capable of being opposed to the first magnets when the first rotating member rotates relative to the second rotating member, the positions being in the vicinity of the rotation axis; and
a third magnet group that constitutes the second magnetic force unit in cooperation with a part of the first magnet group and that includes a plurality of third magnets that are arranged at predetermined intervals in the direction of the circumference whose center is the rotation axis and are arranged in positions within the opposing area on the interaction surface of the second rotating member such that adjacent magnetic poles are different from each other, the positions being outward with respect to the second magnets,
wherein each third magnet has an area approximately equal to that of each second magnet and has a magnetic pole different from that of the second magnet that is positioned between the third magnet and the rotation axis.

3. The magnetic coupling device according to claim 2, wherein
each of the first magnets that constitute the first magnet group includes an inner-circumference magnet component that is provided in an area in the vicinity of the rotation axis and an outer-circumference magnet component that is provided radially outward with respect to the inner-circumference magnet component such that the outer-circumference magnet component is separated from the inner-circumference magnet component,
the inner-circumference magnet component is displaced radially outward in a single direction of rotation about the rotation axis, and
the second magnets that constitute the second magnet group are provided in the opposing area on the interaction surface of the second rotating member, and each of the second magnets has an area approximately equal to that of the inner-circumference magnet component and is displaced radially outward in the single direction of rotation about the rotation axis, the opposing area being capable of being opposed to the inner-circumference magnet components when the first rotating member rotates relative to the second rotating member.

4. The magnetic coupling device according to claim 3, wherein a magnet unit for causing repulsion or attraction between the interaction surface of the first rotating member and the interaction surface of the second rotating member using the magnetic force is arranged between the inner-circumference magnet components and the outer-circumference magnet components on the interaction surface of the first rotating member and between the second magnets and the third magnets on the interaction surface of the second rotating member.

5. The magnetic coupling device according to claim 1, wherein
the first magnetic force unit includes
inner-circumference magnets that have the same magnetic pole and that are arranged to be opposed to each other in positions on the respective interaction surfaces of the first rotating member and the second rotating member such that the inner-circumference magnets surrounds the rotation axis, the positions being in the vicinity of the rotation axis;
a first middle-circumference magnet group that includes a plurality of first middle-circumference magnets that are arranged at predetermined intervals in the direction of the circumference whose center is the rotation axis and are arranged in positions on the interaction surface of the first rotating member such that adjacent magnetic poles are the same, the positions being outward with respect to the inner-circumference magnet; and
a second middle-circumference magnet group that includes a plurality of second middle-circumference magnets that have the same magnetic pole as that of the first middle-circumference magnets and that are arranged at predetermined intervals in the direction of the circumference whose center is the rotation axis and are arranged in positions within an opposing area on the interaction surface of the second rotating member such that adjacent magnetic poles are the same, the opposing area being capable of being opposed to the first middle-circumference magnets when the first rotating member rotates relative to the second rotating member, and
the second magnetic force unit includes
an outer-circumference magnetic member group that includes outer-circumference magnetic members that are arranged at predetermined intervals in the direction of the circumference whose center is the rotation axis and are arranged in positions on the interaction surface of the first rotating member, the positions being radially outward with respect to the first middle-circumference magnets; and
an outer-circumference magnet group that includes a plurality of outer-circumference magnets that are arranged at predetermined intervals in the direction of the circumference whose center is the rotation axis and are arranged in positions on the interaction surface of the second rotating member such that adjacent magnetic poles are different from each other, the positions being capable of being opposed to the outer-circumference magnets when the first rotating member rotates relative to the second rotating member.

6. The magnetic coupling device according to claim 5, wherein the outer-circumference magnets and the outer-circumference magnetic members that constitutes the second magnetic force unit are arranged respectively on the interaction surface of the first rotating member and the interaction surface of the second rotating member such that the outer-circumference magnets and the outer-circumference magnetic members are aligned with the magnets that constitutes the first magnetic force unit in the direction of the rotation axis.

7. The magnetic coupling device according to claim 1, wherein the first magnet force unit and the second magnet force unit are incorporated, in a common casing, together with the first rotating member and the second rotating member.

8. A magnetic coupling device comprising:
a first rotating member and a second rotating member that are arranged such that their respective interaction surfaces are opposed to each other while being separated from each other and that are rotatable about a common rotation axis that extends in a direction orthogonal to the interaction surfaces, to transmit torque from one of the first and second rotating members to the other using a magnetic force that is generated between the interaction surface of the first rotating member and the interaction surface of the second rotating member;
a first magnetic force unit that mainly causes magnetic repulsion in the direction of the rotation axis between an inner circumference area on the interaction surface of the first rotating member and an inner circumference area on the interaction surface of the second rotating member, the inner circumference areas being in the vicinity of the rotation axis; and
a second magnetic force unit that mainly causes magnetic attraction in the direction of the rotation axis between an outer circumference area on the interaction surface of the first rotating member and an outer circumference area on the interaction surface of the second rotating member, the magnetic attraction being approximately equivalent to the magnetic repulsion, the outer circumference areas being radially outward with respect to the first magnetic force unit,
a first magnet group that includes a plurality of first magnets that are arranged on the interaction surface of the first rotating member at predetermined intervals in the direction of the circumference whose center is the rotation axis such that adjacent magnetic poles are different from each other;
a second magnet group that constitutes the first magnetic force unit in cooperation with a part of the first magnet group and that includes a plurality of second magnets that are arranged at predetermined intervals in the direction of the circumference whose center is the rotation axis and are arranged in positions within an opposing area on the interaction surface of the second rotating member such that adjacent magnetic poles are different from each other, the opposing area being capable of being opposed to the first magnets when the first rotating member rotates relative to the second rotating member, the positions being in the vicinity of the rotation axis; and
a third magnet group that constitutes the second magnetic force unit in cooperation with a part of the first magnet group and that includes a plurality of third magnets that are arranged at predetermined intervals in the direction of the circumference whose center is the rotation axis and are arranged in positions within the opposing area on the interaction surface of the second rotating member such that adjacent magnetic poles are different from each other, the positions being outward with respect to the second magnets,
wherein each third magnet has an area approximately equal to that of each second magnet and has a magnetic pole different from that of the second magnet that is positioned between the third magnet and the rotation axis.

9. The magnetic coupling device according to claim 8, wherein
each of the first magnets that constitute the first magnet group includes an inner-circumference magnet component that is provided in an area in the vicinity of the rotation axis and an outer-circumference magnet component that is provided radially outward with respect to the inner-circumference magnet component such that the outer-circumference magnet component is separated from the inner-circumference magnet component, the inner-circumference magnet component is displaced radially outward in a single direction of rotation about the rotation axis, and the second magnets that constitute the second magnet group are provided in the opposing area on the interaction surface of the second rotating member, and each of the second magnets has an area approximately equal to that of the inner-circumference magnet component and is displaced radially outward in the single direction of rotation about the rotation axis, the opposing area being capable of being opposed to the inner-circumference magnet components when the first rotating member rotates relative to the second rotating member.

10. The magnetic coupling device according to claim 9, wherein a magnet unit for causing repulsion or attraction between the interaction surface of the first rotating member and the interaction surface of the second rotating member using the magnetic force is arranged between the inner-circumference magnet components and the outer-circumference magnet components on the interaction surface of the first rotating member and between the second magnets and the third magnets on the interaction surface of the second rotating member.

11. A magnetic coupling device comprising:
a first rotating member and a second rotating member that are arranged such that their respective interaction surfaces are opposed to each other while being separated from each other and that are rotatable about a common rotation axis that extends in a direction orthogonal to the interaction surfaces, to transmit torque from one of the first and second rotating members to the other using a magnetic force that is generated between the interaction surface of the first rotating member and the interaction surface of the second rotating member;

a first magnetic force unit that mainly causes magnetic repulsion in the direction of the rotation axis between an inner circumference area on the interaction surface of the first rotating member and an inner circumference area on the interaction surface of the second rotating member, the inner circumference areas being in the vicinity of the rotation axis; and a second magnetic force unit that mainly causes magnetic attraction in the direction of the rotation axis between an outer circumference area on the interaction surface of the first rotating member and an outer circumference area on the interaction surface of the second rotating member, the magnetic attraction being approximately equivalent to the magnetic repulsion, the outer circumference areas being radially outward with respect to the first magnetic force unit, wherein the first magnetic force unit includes
inner-circumference magnets that have the some magnetic pole and that are arranged to be opposed to each other in positions on the respective interaction surfaces of the first rotating member and the second rotating member such that the inner-circumference magnets surrounds the rotation axis, the positions being in the vicinity of the rotation axis;

a first middle-circumference magnet group that includes a plurality of first middle-circumference magnets that are arranged at predetermined intervals in the direction of the circumference whose center is the rotation axis and are arranged in positions on the interaction surface of the first rotating member such that adjacent magnetic poles are the same, the positions being outward with respect to the inner-circumference magnet; and a second middle-circumference magnet group that includes a plurality of second middle-circumference magnets that have the same magnetic pole as that of the first middle-circumference magnets and that are arranged at predetermined intervals in the direction of the circumference whose center is the rotation axis and are arranged in positions within an opposing area on the interaction surface of the second rotating member such that adjacent magnetic poles are the same, the opposing area being capable of being opposed to the first middle-circumference magnets when the first rotating member rotates relative to the second rotating member, and the second magnetic force unit includes
an outer-circumference magnetic member group that includes outer circumference magnetic members that are arranged at predetermined intervals in the direction of the circumference whose center is the rotation axis and are arranged in positions on the interaction surface of the first rotating member, the positions being radially outward with respect to the first middle-circumference magnets; and an outer-circumference magnet group that includes a plurality of outer-circumference magnets that are arranged at predetermined intervals in the direction of the circumference whose center is the rotation axis and are arranged in positions on the interaction surface of the second rotating member such that adjacent magnetic poles are different from each other, the positions being capable of being opposed to the outer-circumference magnets when the first rotating member rotates relative to the second rotating member.

12. The magnetic coupling device according to claim 11, wherein the outer-circumference magnets and the outer-circumference magnetic members that constitutes the second magnetic force unit are arranged respectively on the interaction surface of the first rotating member and the interaction surface of the second rotating member such that the outer-circumference magnets and the outer-circumference magnetic members are aligned with the magnets that constitutes the first magnetic force unit in the direction of the rotation axis.

* * * * *